Feb. 3, 1942.    M. A. WECKERLY    2,272,142
WEIGHING SCALES
Filed Aug. 29, 1939
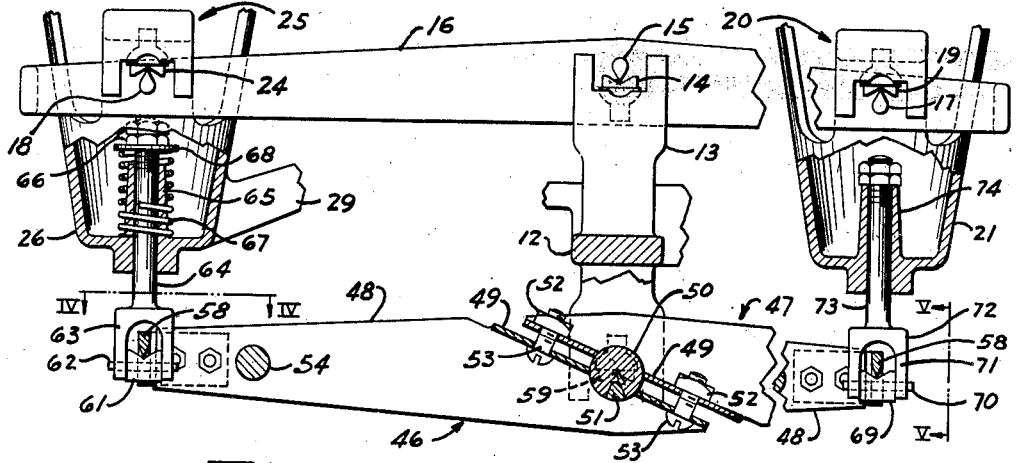
Fig. II
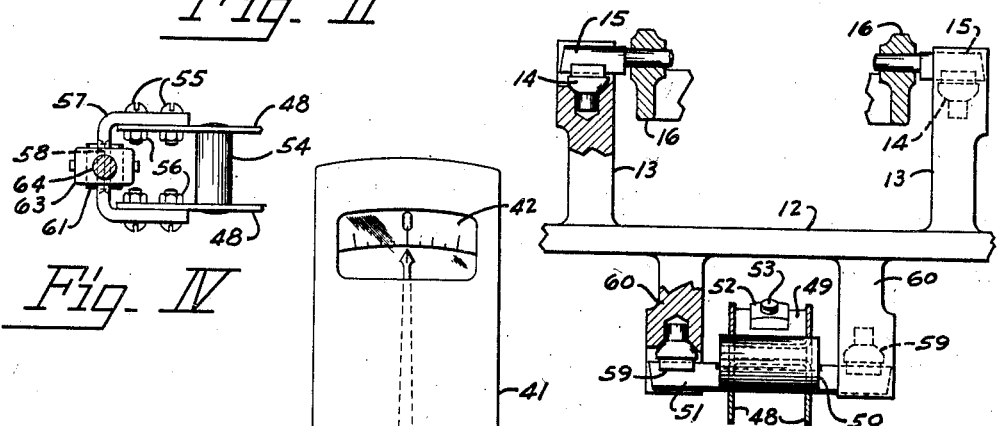
Fig. IV
Fig. III
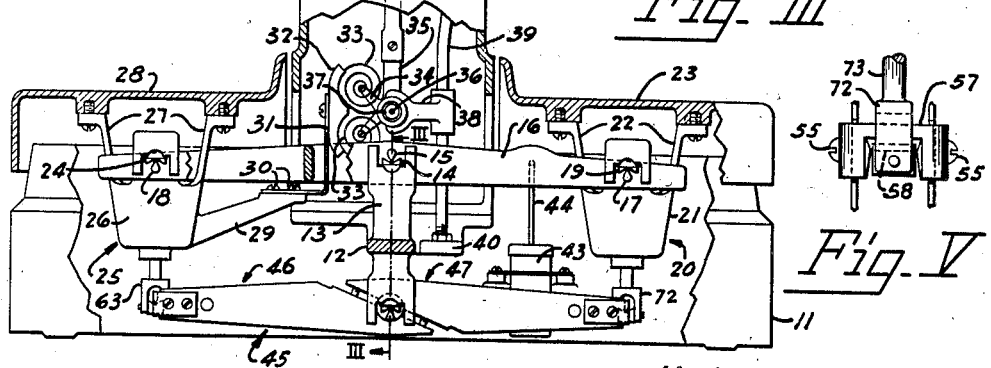
Fig. I
Fig. V
Mark A. Weckerly
INVENTOR
BY Marshall & Marshall
ATTORNEYS Patented Feb. 3, 1942

2,272,142

UNITED STATES PATENT OFFICE 2,272,142

WEIGHING SCALES

Mark A. Weckerly, Toledo, Ohio, assignor to Toledo Scale Company, a corporation of New Jersey Application August 29, 1939, Serial No. 292,437

11 Claims. (Cl. 265—54)

This invention relates generally to weighing scales, and more particularly to weighing scales of the even balance type in which a single check link is employed for maintaining the condition of level of the load platter and the counterpoise platter.

The principal object of this invention is the provision of a substantially rigid check link in which the ends are adapted to be individually adjusted.

Another object is the provision of an improved adjustable check link which obviates lost play or friction due to incorrect pivot and bearing adjustments.

Another object is the provision of an improved check link construction functioning simultaneously to maintain the condition of level of a load and a counterbalancing receiver and as a means for retaining the bearings of such receivers in engagement with their supporting pivots when loads are placed near the edge of said receivers.

And still another object is the provision of a check link made from light yet rigid stampings to which pivots are adjustably mechanically attached.

These, and other objects and advantages will be apparent from the following description in which reference is had to the accompanying drawing, illustrating a preferred embodiment of the invention and wherein similar reference numerals refer to similar parts throughout the several views.

Referring to the drawing:

Fig. I is a front elevational view of a device embodying the invention, portions of the housing members and receivers being broken away to admit a clearer view of the mechanism.

Fig. II is an enlarged fragmentary view of the mechanism showing the checking means in greater detail, parts being broken away and parts in section.

Fig. III is an enlarged fragmentary sectional view substantially along the line III—III of Fig. I.

Fig. IV is a fragmentary plan view of a check link end, substantially as seen from along the line IV—IV of Fig. II; and, Fig. V is an enlarged end elevational view of the check link, substantially as seen from along the line V—V of Fig. II.

Referring to the drawing in detail:

The scale in which the invention is shown embodied is fully disclosed in Patent No. 2,217,243 and comprises a base or principal frame 11 which is a rectangular shell with rounded corners and an inwardly inclined upper edge. Secured to bosses formed on the interior of the shell 11 is a bracket 12 provided with upstanding portions 13 in which are mounted fulcrum bearings 14. Supported for rocking movement on the fulcrum bearings 14 are knife edge fulcrum pivots 15 which are fixedly secured to an even-armed lever 16. Also fixedly secured to the even-armed lever 16 are a pair of commodity supporting pivots 17 and a pair of counterpoise supporting pivots 18. Engaging the commodity supporting pivots 17 are commodity platter spider bearings 19 which are mounted in inverted sockets in a commodity platter spider 20. The commodity platter spider 20 is formed with a loading box 21 and with arms 22 to which is secured a commodity platter 23. Engaging the counterpoise supporting pivots are counterpoise platter spider bearings 24 which are mounted in inverted sockets on a counterpoise platter spider 25. This counterpoise platter spider is also formed with a loading box 26 and arms 27 to which is secured a counterpoise platter 28. The commodity platter and the counterpoise platter have skirts which overhang the inwardly inclined edge of the shell 11 to prevent the ingress of dirt.

Extending laterally from the counterpoise spider 25 is an arm 29 having a horizontal flat face to which, by means of screws 30, is fastened an angular member 31 having fixed thereto a clamp 32 which clamps the outer ends of a pair of opposed spiral springs 33. The inner ends of these springs are secured to pins extending laterally from a fork-like portion 34 of an indicator body 35. This indicator body is fixedly mounted upon a shaft 36 whose ends are fulcrumed in ball bearings 37 held in a bifurcated bracket 38 which is clamped upon a vertically extending rod 39. The lower end of this rod is screwed into a laterally extending portion 40 of the bracket 12 and extends upwardly into a housing 41 which is mounted upon the shell 11 between the inner ends of the commodity platter 23 and the counterpoise platter 28 and supports at its upper end a chart 42 which is visible through an opening in the housing 41.

To dampen vibrations of the scale a dashpot 43 is provided whose plunger (not shown) is pivotally connected through the rod 44 to the lever 16.

To maintain the condition of level, a check link 45 is provided. This check link comprises two identical stamped members 46 and 47, each of these members comprises two parallel, spaced web-like arms 48 (Fig. III) and a connecting web 49 which is disposed in a diagonal position relative to the longitudinal axis of the arms 48. A substantially semicircular notch is milled through the connecting web 49 and partially into the adjacent portions of the arms 48 in such a position that when the two members 46 and 47 are assembled in inverted relation, these semicircular notches substantially encircle a cylindrical retainer 50 having a longitudinal extending V notch in which a hardened steel pivot 51, having the cross section of a sector of a circle whose diameter is equal to the diameter of the cylindrical member 50, is located. The members 46, 47, 50 and 51 are then locked into a unit by the cooperation of nuts 52 and screws 53 which extend through spaced and aligned holes in the webs 49.

A spacer 54 is riveted between the arms 48 (Fig. IV) and immediately adjacent the ends of each of these arms are two spaced aligned holes through which screws 55 project which, by means of nuts 56, serve to clamp a substantially U-shaped member 57 thereto. This member is provided with a milled knife edge pivot 58.

Since the members 46 and 47 are assembled to each other in spaced relation it must be observed that the design of the member 57 and the location of the holes adjacent the ends in the arms 48 be such that the member 57 can be assembled to the ends of these arms in such a manner on one of the members that when the two members 46 and 47 are assembled both edges of the pivots 58 will point in the same direction and that these edges lie in a plane with the edge of the pivot 51.

The edges of the ends of the pivot 51 engage bearings 59 seated in inverted sockets in downwardly extending portions 60 of the bracket 12. The pivot 58 of the check link member 46 engages a V notch in a bearing 61 mounted upon a pintle 62 extending between the arms of a clevis-like head 63 of a spider stem 64. This spider stem 64 extends upwardly through an accurately reamed hole in a boss 65 in the interior of the loading box 26 of the spider 25 and is provided with adjustable lock nuts 66 and a helical compression spring 67 is interposed between the inner bottom of the loading box 26 and a washer 68 which is circumjacently mounted on the stem 64 immediately below the lock nuts 66. The bias of the spring 67, through the member 46, urges the pivot 51 into engagement with the bearings 59 and the pivot 58 in the member 47 into engagement with a bearing 69 pivoted upon a pintle 70 passing through spaced arms 71 of a clevis-like head 72 of a spider stem 73 which is adjustably seated in a boss 74 of the loading box 21 of the spider 20.

The function of a check link is to maintain a parallelogram which, in this case, consists of the distances between the edges of the pivots 15 and 18, 58 and 51, 18 and 58 and 15 and 51, as well as the similar distances on the opposite end of the lever. When there is only one force parallelogram to establish and maintain, as in a single platter scale, this is no problem nor is it a problem to maintain force parallelograms on double pan scales when separate check links are employed. It becomes exceedingly difficult, however, in that type of scale when a single rigid check link is used, then many hand adjustments must be resorted to, such as the filing of pivots, bending of links, etc. It is desirable to use a rigid check link since scales of this type are usually of small size and there is little available space in the base.

The heretofore described check link is substantially a rigid member, it is light and by loosening one of the screws 53 and tightening the other the pivot distances on one side may be adjusted independently of the distance on the other side. This is highly important since the pivots in the load and counterpoise supporting lever are usually inserted so that "range" is provided. This is accomplished by setting the fulcrum pivot 15 so that its knife edge lies in a plane somewhat below the plane of the edges of pivots 17 and 18. This range is provided to compensate for flexure in the lever under load and pivot wear.

In addition to maintenance of the condition of level of the platters this check link performs another function, as previously mentioned. Scales of this type must be of small size; but users demand a comparatively large platter and in order to obtain the desired size the edges of the platters extend considerably beyond the ends of the pivots and the possibility exists that the platter will tilt on a pivot when a load is placed near the edge. The construction of the check link built according to the invention, however obviates such tilting since the spring 67 invariably holds all the pivots in engagement with their bearings and prevents their disengagement when a load is placed near the edges of the platters. Additionally the bias of the spring obviates lost play and relative movement between the knife edges and their bearing surfaces thus eliminating wear and the resultant friction.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism including a lever, a plurality of spaced, edged pivots in said lever, a bracket, a fulcrum bearing in said bracket for engaging one of said pivots in said lever, a check link, a plurality of spaced edged pivots in said check link, the longitudinal spacing of said pivots in said check link being the same as the longitudinal spacing of said pivots in said lever, said check link being assembled in said device with the edges of its pivots directed in opposition to the edges of said pivots in said lever, a fulcrum bearing for one of said pivots in said check link, said fulcrum bearing being positioned in a vertical plane passing through said fulcrum bearing for said lever, a member supported upon each of said other pivots in said lever, a member adjustably secured to each of said members supported upon said pivots in said lever, a bearing in each of said adjustable members for engaging the other of said pivots in said check link, resilient means cooperating with one of said members supported upon said lever and said member adjustably secured thereto for imparting constant, opposed forces on all of said pivots in said lever and check link and said bearings engaging them, said resilient means comprising a helical spring and means for adjusting the tension of said spring.

2. In a device of the class described, in combination, weighing mechanism including a lever, a plurality of spaced, edged pivots in said lever, a bracket, a fulcrum bearing in said bracket for engaging one of said pivots in said lever, a check link, a plurality of spaced, edged pivots in said check link, the longitudinal spacing of said pivots in said check link being the same as the longitudinal spacing of said pivots in said lever, said check link being assembled in said device with the edges of its pivots directed in opposition to the edges of said pivots in said lever, a fulcrum bearing for one of said pivots in said check link, said fulcrum bearing being positioned in a vertical plane passing through said fulcrum bearing for said lever, a member supported upon each of said other pivots in said lever, a member adjustably secured to each of said members supported upon said pivots in said lever, a bearing in each of said adjustable members for engaging the other of said pivots in said check link, resilient means cooperating with one of said members supported upon said lever and said member adjustably secured thereto for imparting constant opposed forces on all of said pivots in said lever and check link and said bearings engaging them and said resilient means comprising a helical spring.

3. In a device of the class described, in combination, weighing mechanism including a lever, a plurality of spaced, edged pivots in said lever, a bracket, a fulcrum bearing in said bracket for engaging one of said pivots in said lever, a check link, a plurality of spaced edged pivots in said check link, the longitudinal spacing of said pivots in said check link being the same as the longitudinal spacing of said pivots in said lever, said check link being assembled in said device with the edges of its pivots directed in opposition to the edges of said pivots in said lever, a fulcrum bearing for one of said pivots in said check link, said fulcrum bearing being positioned in a vertical plane passing through said fulcrum bearing for said lever, a member supported upon each of said other pivots in said lever, a member adjustably secured to each of said members supported upon said pivots in said lever, a bearing in each of said adjustable members for engaging the other of said pivots in said check link and resilient means cooperating with one of said members supported upon said lever and said member adjustably secured thereto for imparting constant opposed forces on all of said pivots in said lever and check link and said bearings engaging them.

4. In a device of the class described, in combination, weighing mechanism including an even-armed lever, fulcrum pivots in said lever, load and counterpoise supporting pivots in said lever in spaced relation to said fulcrum pivots, a check link provided with pivots, said pivots in said check link being spaced to conform to the spacings of the pivots in said lever, a plurality of means provided with bearings for engaging said pivots in said lever and in said check link and a resilient means between some of said bearings for invariably urging all of said bearings into engagement with their pivots.

5. In a device of the class described, in combination, weighing mechanism comprising a centrally pivoted lever, platter structure pivotally carried upon the opposite ends of said lever, a check link for maintaining the condition of level of said platter structures, means connecting said platter structures to said check link, said check link comprising a central pivot having a cylindrical body, a pair of arms each comprising a pair of spaced webs, means for adjusting and locking said arms to said cylindrical body of said pivot and a U-shaped member having one of its edges milled to a V formation adjustably secured to the outer ends of each of said spaced webs.

6. In a device of the class described, in combination, weighing mechanism comprising a centrally pivoted lever, platter structure pivotally carried upon the opposite ends of said lever, a check link for maintaining the condition of level of said platter structures, means connecting said platter structures to said check link, said check link comprising a central pivot having a cylindrical body, a pair of arms adjustable about the cylindrical body of said pivot, means for adjusting and locking said arms with reference to such cylindrical body of said pivot, each of said check link arms comprising a pair of parallelly spaced webs and an integral connecting web disposed at an angle relative to the longitudinal axis of the parallel webs and a semicircular notch extending through said diagonally disposed web adapted to snugly engage said cylindrical body of said central pivot, means for clamping said arms to said pivot, said clamping means comprising a screw penetrating said diagonally disposed webs on opposite sides of said pivot and a nut threaded upon each of said screws.

7. In a device of the class described, in combination, weighing mechanism comprising a centrally pivoted lever, platter structure pivotally carried upon the opposite ends of said lever, a check link for maintaining the condition of level of said platter structures, means connecting said platter structures to said check link, said check link comprising a central pivot having a cylindrical body, a pair of arms adjustable about the cylindrical body of said pivot, each of said check link arms comprising a pair of parallelly spaced webs and an integral connecting web disposed in a diagonal position relative to the longitudinal axis of the parallel webs and a semicircular notch extending through said diagonally disposed web adapted to snugly engage said cylindrical body of said central pivot and means for clamping said arms to said pivot.

8. In a device of the class described, in combination, weighing mechanism comprising a centrally pivoted lever, platter structures pivotally carried upon the opposite ends of said lever, a check link for maintaining the condition of level of said platter structures, means connecting said platter structures to said check link, said check link comprising a central pivot having a cylindrical body, a pair of oppositely directed arms adjustable about the cylindrical body of said pivot, each of said arms having a semicircular surface for engagement with such cylindrical body and means for adjusting and locking said arms to such cylindrical body of said pivot.

9. In a device of the class described, in combination, a frame, a lever rockably mounted on said frame, a check link rockably mounted upon said frame in spaced relation to said lever, a pair of pivots in said lever, a pivot in said check link, a platter support, said platter support comprising a hollow body, arms projecting from said body, bearings in said arms and adapted to be mounted upon said pair of pivots in said lever, a bearing adjustably associated with said body for engagement with said pivot in said check link, said bearing associated with said body having a stem adapted to enter said hollow body of said platter support, means within said hollow body for adjustably retaining said stem and said means including a resilient member for urging said bearing associated with said body into engagement with said pivot in said check link.

10. In a device of the class described, in combination, a frame, a lever rockably mounted on said frame, a check link rockably mounted upon said frame in spaced relation to said lever, a pair of pivots in said lever, a pivot in said check link, a platter support, said platter support comprising a hollow body, arms projecting from said body, bearings in said arms and adapted to be mounted upon said pair of pivots in said lever, a bearing adjustably associated with said body for engagement with said pivot in said check link, said bearing associated with said body having a stem adapted to enter said hollow body of said platter support, means within said hollow body for adjustably retaining said stem, said means including a helical spring for urging said bearing associated with said body into constant engagement with said pivot in said check link.

11. In a device of the class described, in combination, a frame, a two-armed lever fulcrumed on said frame and having a fulcrum and knife-edged load and counterpoise pivots, a two-armed check link, means for connecting and locking the arms of such check link together to obtain a rigid unitary member, said two-armed check link having knife-edged pivots corresponding to said pivots in said two-armed lever, load and counterpoise receivers, and members for pivotally supporting said receivers upon said load and counterpoise pivots in said lever, said means for connecting and locking such check link arms into a rigid unitary member being adapted to adjust the check link arms into exact parallel relation to the arms of said lever.

MARK A. WECKERLY.